United States Patent
Ucar et al.

(10) Patent No.: US 12,003,367 B2
(45) Date of Patent: Jun. 4, 2024

(54) SYSTEMS AND METHODS FOR FAST VEHICULAR MICRO CLOUD FORMATION

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Onur Altintas, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/877,328

(22) Filed: Jul. 29, 2022

(65) Prior Publication Data
US 2024/0039785 A1  Feb. 1, 2024

(51) Int. Cl.
*G08G 1/01* (2006.01)
*H04L 41/0816* (2022.01)
(Continued)

(52) U.S. Cl.
CPC ......... *H04L 41/0816* (2013.01); *G08G 1/012* (2013.01); *H04L 67/10* (2013.01); *H04L 67/12* (2013.01)

(58) Field of Classification Search
CPC ........ G08G 1/123; G08G 1/127; G08G 1/012; G08G 1/0129; G08G 1/22; G08G 1/01;
(Continued)

(56) References Cited

U.S. PATENT DOCUMENTS 9,466,156 B2 * 10/2016 Getchius .............. G06Q 10/063
10,115,016 B2 * 10/2018 Grimm ................. H04N 23/80
(Continued)

FOREIGN PATENT DOCUMENTS

WO   WO-2017210200 A1 * 12/2017 .......... B60W 30/165

OTHER PUBLICATIONS

Ucar, S. et al., "Multihop-Cluster-Based IEEE 802.11p and LTE Hybrid Architecture for VANET Safety Message Dissemination," in IEEE Transactions on Vehicular Technology, vol. 65, No. 4, Apr. 2016, pp. 2621-2636 (16 pages).
(Continued)

*Primary Examiner* — Tonia L Dollinger
*Assistant Examiner* — Linh T. Nguyen
(74) *Attorney, Agent, or Firm* — Christopher G. Darrow; Darrow Mustafa PC (57) ABSTRACT

Systems and methods for fast vehicular micro cloud formation are disclosed herein. In one example, a system includes a processor and a memory in communication with the processor and having instructions. When executed by the processor, the instructions cause the processor to receive an identifier of the vehicle and determine if the identifier matches the information in stored metadata. If the identifier matches the information in the stored metadata, the vehicle is allowed to join the vehicular micro cloud without performing a standard onboarding procedure. Otherwise, a standard onboarding procedure is performed to allow the vehicle to join the vehicular micro cloud.

16 Claims, 5 Drawing Sheets

(51) Int. Cl.
*H04L 67/10* (2022.01)
*H04L 67/12* (2022.01)

(58) Field of Classification Search
CPC ............ G06V 2201/08; G06V 10/255; G06V 20/625; G06V 20/44; G06V 20/54; G06V 40/197; H04L 67/12; G06T 2207/30252; G06T 2207/30248; G06T 2207/10024; G06T 7/001
See application file for complete search history.

(56) References Cited

U.S. PATENT DOCUMENTS

| | | | |
|---|---|---|---|
| 10,791,543 B2 | 9/2020 | Tseng et al. | |
| 10,948,927 B1* | 3/2021 | Harris | G08G 1/22 |
| 11,178,219 B2 | 11/2021 | Higuchi et al. | |
| 2007/0027614 A1* | 2/2007 | Reeser | G08G 1/20 |
| | | | 340/995.12 |
| 2014/0005906 A1* | 1/2014 | Pandita | B60W 30/17 |
| | | | 706/46 |
| 2014/0045472 A1* | 2/2014 | Sharma | H04L 12/1818 |
| | | | 455/416 |
| 2015/0185034 A1* | 7/2015 | Abhyanker | G05D 1/0088 |
| | | | 701/23 |
| 2018/0061253 A1* | 3/2018 | Hyun | G06N 3/08 |
| 2019/0044728 A1* | 2/2019 | Karmoose | H04L 9/0643 |
| 2019/0147668 A1* | 5/2019 | Ravi | H04W 12/71 |
| | | | 701/29.6 |
| 2020/0226921 A1 | 7/2020 | Higuchi et al. | |
| 2020/0300649 A1* | 9/2020 | Kim | G08G 1/0968 |
| 2021/0280057 A1* | 9/2021 | Uçar | G08G 1/012 |
| 2021/0350708 A1* | 11/2021 | Kim | G05D 1/0295 |
| 2022/0007379 A1* | 1/2022 | Cao | H04W 4/40 |
| 2022/0129009 A1* | 4/2022 | Park | G08G 1/22 |
| 2022/0147337 A1* | 5/2022 | Michelsohn | G06F 11/1433 |
| 2023/0049377 A1* | 2/2023 | Gherekhloo | H04W 4/40 |
| 2023/0063010 A1* | 3/2023 | Zhang | G08G 1/22 |
| 2023/0066197 A1* | 3/2023 | Zhang | G08G 1/22 |
| 2023/0171314 A1* | 6/2023 | Onti Srinivasan | G06F 18/2431 |
| | | | 370/474 |

OTHER PUBLICATIONS

Hattab, G. et al., "Optimized Assignment of Computational Tasks in Vehicular Micro Clouds," Association for Computing Machinery, https://doi.org/10.1145/3301418.3313937, Mar. 25, 2019, pp. 1-6 (6 pages).

Hagenauer, F. et al., "Vehicular Micro Cloud in Action: On Gateway Selection and Gateway Handovers," Ad Hoc Networks, vol. 78, https://doi.org/10.1016/j.adhoc.2018.05.014, Sep. 2018, pp. 73-83 (10 pages).

OAuth, Open Authorization, is a fairly well-known open standard for access delegation. (https://en.wikipedia.org/wiki/OAuth.) (10 pages).

* cited by examiner

SYSTEMS AND METHODS FOR FAST VEHICULAR MICRO CLOUD FORMATION

TECHNICAL FIELD

The subject matter described herein relates, in general, to systems and methods for forming vehicular micro clouds.

BACKGROUND

The background description provided is to present the context of the disclosure generally. To the extent it may be described in this background section, the work of the inventors and aspects of the description that may not otherwise qualify as prior art at the time of filing are neither expressly nor impliedly admitted as prior art against the present technology.

Some current vehicles can communicate with other vehicles to exchange information and perform other services. In one development, some vehicles can form vehicular micro clouds, wherein the vehicular micro cloud members can share resources, such as communication, processing, and storage resources. Generally, each vehicular micro cloud has at least one micro cloud leader, which may be another vehicle, an edge/roadside server, and/or a cloud-based server.

To join a vehicular micro cloud, an onboarding process is performed, such as initial security checks, identity verification, and resource availability inspection, which can be rather lengthy. Additionally, because vehicular micro clouds are made up of vehicles that can move outside the effective communication range of the vehicular micro cloud with little notice, a lengthy onboarding process can result in situations where vehicles are unable to join the vehicular micro cloud before they leave the effective communication range of the vehicular micro cloud, which will degrade the overall performance and advantages of vehicular micro clouds.

SUMMARY

This section generally summarizes the disclosure and is not a comprehensive explanation of its full scope or all its features.

In one embodiment, a system includes a processor and a memory in communication with the processor and having instructions. When executed by the processor, the instructions cause the processor to receive an identifier of the vehicle and determine if the identifier matches the information in stored metadata. If the identifier matches the information in the stored metadata, the vehicle is allowed to join the vehicular micro cloud without performing a standard onboarding procedure. Otherwise, a standard onboarding procedure is performed to allow the vehicle to join the vehicular micro cloud. By allowing vehicles with identifiers that match the stored metadata to skip the onboarding process, vehicular micro cloud formation can be accelerated and performance can be improved.

In another embodiment, a method for onboarding a vehicle to a vehicular micro cloud includes the steps of receiving an identifier of the vehicle and determining if the identifier of the vehicle matches the information in stored metadata. In response to a determination that the identifier matches the information in the metadata, the method includes the step of allowing the vehicle to join the vehicular micro cloud without performing a standard onboarding procedure. In response to determining that the identifier of the vehicle does not match the information in the stored metadata, the method includes the step of performing the standard onboarding procedure for allowing the vehicle to join the vehicular micro cloud.

In yet another embodiment, a non-transitory computer readable medium includes instructions that, when executed by a processor, cause the processor to receive an identifier of the vehicle and determine if the identifier matches the information in stored metadata. If the identifier matches the information in the stored metadata, the vehicle is allowed to join the vehicular micro cloud without performing a standard onboarding procedure. Otherwise, a standard onboarding procedure is performed to allow the vehicle to join the vehicular micro cloud.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is a system and method that allows for the fast formation of vehicular micro clouds. By their very nature, vehicles are mobile and move from location to location. Because vehicular micro clouds include moving vehicles that act as members of the vehicular micro clouds, it is not uncommon for vehicles to join/leave a particular vehicular micro cloud over short periods. Prior art solutions required that any vehicle joining a vehicular micro cloud undergo an onboarding procedure that requires initial security checks, identity verification, and resource availability determination. This traditional onboarding procedure can be very time-consuming and prevents vehicles that may be only able to access the vehicular micro cloud for a brief period of time from using/providing resources from/to other members of the vehicular micro cloud.

Vehicular micro clouds are described in the patent applications that are incorporated by reference in this paragraph. This patent application is related to the following patent applications, the entirety of each of which is incorporated herein by reference: U.S. patent application Ser. No. 16/943,443 filed on Jul. 30, 2020 and entitled "Vehicular Nano Cloud"; U.S. Pat. No. 10,924,337 issued on Feb. 16, 2021 and entitled "Vehicular Cloud Slicing"; U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; U.S. patent application Ser. No. 15/799,963 filed on Oct. 31, 2017 and entitled "Identifying a Geographic Location for a Stationary Micro-Vehicular Cloud"; U.S. patent application Ser. No. 16/443,087 filed on Jun. 17, 2019 and entitled "Cooperative Parking Space Search by a Vehicular Micro Cloud"; U.S. patent application Ser. No. 16/739,949 filed on Jan. 10, 2020 and entitled "Vehicular Micro Clouds for On-demand Vehicle Queue Analysis"; U.S. patent application Ser. No. 16/735,612 filed on Jan. 6, 2020 and entitled "Vehicular Micro Cloud Hubs"; U.S. patent application Ser. No. 16/387,518 filed on Apr. 17, 2019 and entitled "Reorganizing Autonomous Entities for Improved Vehicular Micro Cloud Operation"; U.S. patent application Ser. No. 16/273,134 filed on Feb. 11, 2019 and entitled "Anomaly Mapping by Vehicular Micro Clouds"; U.S. patent application Ser. No. 16/246,334 filed on Jan. 11, 2019 and entitled "On-demand Formation of Stationary Vehicular Micro Clouds"; and U.S. patent application Ser. No. 16/200,578 filed on Nov. 26, 2018 and entitled "Mobility-oriented Data Replication in a Vehicular Micro Cloud."

The systems and methods described in this description allow for fast vehicular micro cloud formation so that vehicles that would otherwise be unable to join the vehicular micro cloud due to the time-consuming traditional onboarding process can more rapidly be allowed to join the vehicular micro cloud so they can use or provide resources from/to the vehicular micro cloud. In one example, the system and method may be integrated within a vehicular micro cloud leader, which may be a server with a fixed location, such as a roadside unit or cloud-based server, or another vehicle.

When a vehicle initially attempts to join the vehicular micro cloud, the system and method perform a traditional onboarding process and generate metadata that includes information regarding the vehicle. While this initial onboarding procedure is similar to a traditional onboarding procedure, the metadata can be utilized when the vehicle leaves and then subsequently rejoins the vehicular micro cloud. Moreover, when the vehicle subsequently attempts to rejoin the vehicular micro cloud, the system receives identifying information from the vehicle and then skips the traditional onboarding procedure when the identifying information is matched to information in stored metadata. This allows a vehicle to rejoin the vehicular micro cloud more rapidly than if it had to undergo the traditional onboarding procedure.

In addition, the metadata cam ne shared with consecutive micro clouds. For example, in situations where multiple micro clouds are formed and a connected vehicle is passing through. In such a case, the metadata is propagated. The connected vehicle passes through the onboarding process once and the contribute to consecutive micro clouds.

The system may also utilize time to live (TTL) information, indicating how long the metadata can be utilized to allow a vehicle to rapidly rejoin the vehicular micro cloud. Moreover, if the TTL information has expired, the vehicle may undergo a traditional onboarding procedure. However, if the TTL information has not expired, the system can utilize information from the metadata to allow the vehicle to more rapidly rejoin the vehicular micro cloud.

Figure 1A:
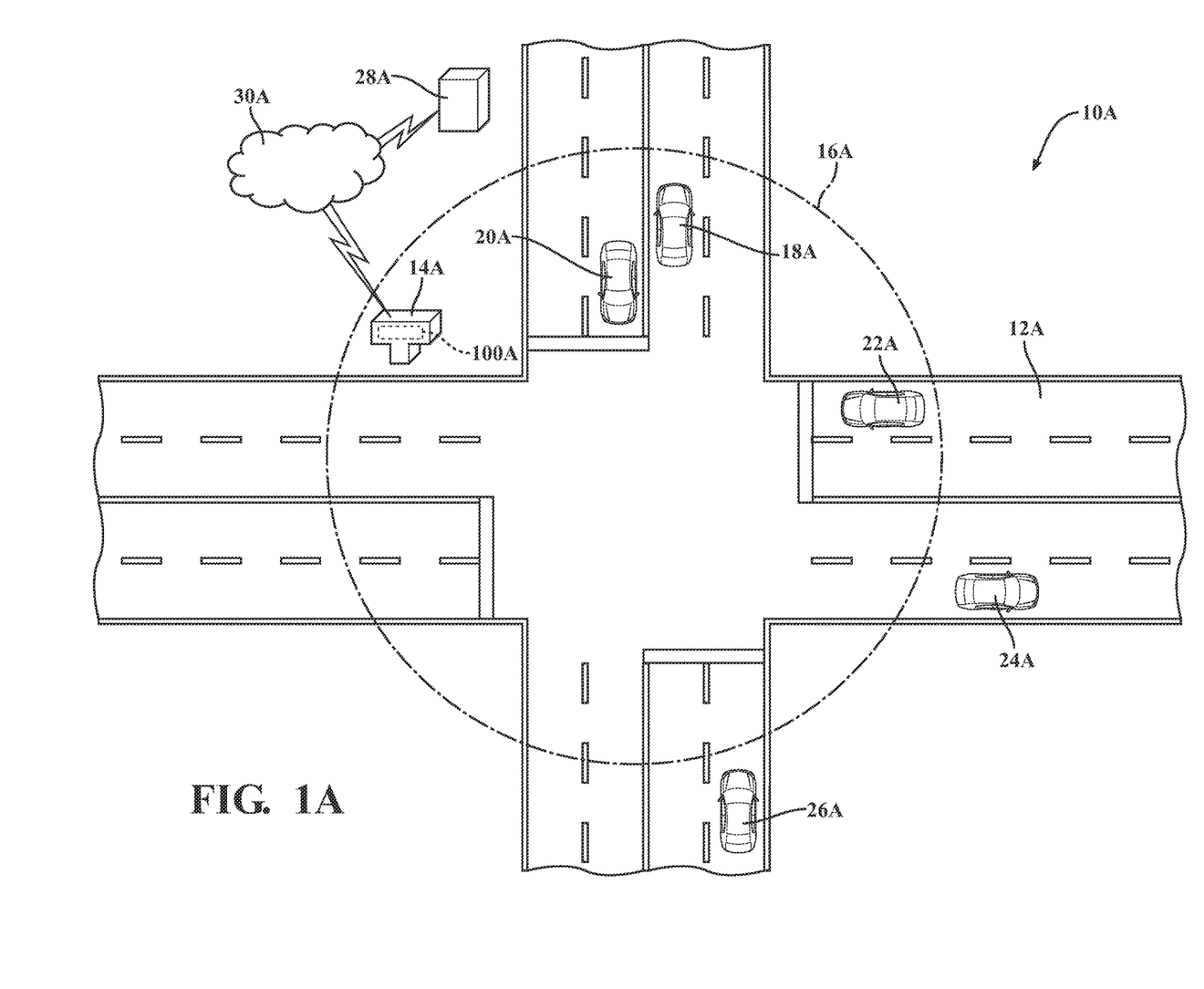
FIG. 1A illustrates one example of a static vehicular micro cloud, wherein a roadside unit acts as the micro cloud leader for the static vehicular micro cloud.

To better understand the systems and methods disclosed herein, reference is made to FIG. 1A, which illustrates one example of a scenario 10A that includes a system 100A that allows for the fast formation of vehicular micro clouds. In this example, the scenario 10A includes several roads 12A that allow vehicles to travel thereon. The configuration of the environment and/or the roads 12A can vary from situation to situation and will not impact the functioning of the system 100A.

In this example, the system 100A is incorporated within a roadside unit (RSU) 14A, sometimes referred to as a roadside server and/or a roadside edge server. However, as will be described later in this description, the system can also be incorporated within a vehicle. In either case, the RSU 14A may have computational, storage, and/or communication capabilities that can be shared with members of a vehicular micro cloud. For example, processing, communication, and/or storage needs can be augmented by the processing, communication, and/or storage capabilities of the system 100A.

In this example, the system 100A may act as a micro cloud leader for the vehicular micro cloud. Moreover, as micro cloud leader, the system 100A is responsible for inviting nearby vehicles as micro cloud members, performing appropriate onboarding procedures, and then subdividing and/or splitting computational, communication, and/or storage needs of the members of the vehicular micro cloud. For example, the system 100A may be able to augment the storage, communication, and computational needs of one or more members of the vehicular micro cloud and/or assign members of the vehicular micro cloud to assist other members of the vehicular micro cloud with their storage, communication, and/or computational needs. Vehicles in the vehicular micro cloud can reach other micro cloud members within a small number of hops of vehicle-to-vehicle (V2V) communications, which allows much tighter collaboration among member vehicles.

Regarding augmenting computational capabilities, the micro cloud leader of the vehicular micro cloud may be able to split application tasks into smaller sub-tasks and distributes them to the micro cloud members. Once the task execution is completed, each micro cloud member replies to the micro cloud leader with the results so that the micro cloud leader can assemble the results into a final output. Of course, other methodologies may also be utilized for augmenting computational capabilities.

The RSU 14A that incorporates the system 100A is generally located near the roads 12A and can communicate with vehicles located within a vehicular micro cloud region 16A. The size of the vehicular micro cloud region can be based on a number of different factors, such as the wireless communication capabilities of the system 100A, the number of vehicles located near the system 100A, and the computational needs of the vehicles located nearby, and other factors. For example, suppose the wireless communication capabilities of the RSU 14A and/or system 100A allow for a greater range of communication. In that case, the vehicular micro cloud region 16A may be larger than another micro cloud region that is supported by an RSU that has more limited wireless communication capabilities. Because the RSU 14A is located in a fixed position, any vehicular micro cloud that it manages as micro cloud leader will be considered a static vehicular micro cloud.

The scenario 10A also illustrates vehicles 18A-26A. The vehicles 18A, 20A, and 22A are shown to be located within the vehicular micro cloud region 16A. Conversely, the vehicles 24A and 26A are located outside the vehicular micro cloud region 16A. As such, the vehicles 18A, 20A, and 22A may be members of a vehicular micro cloud defined by the vehicular micro cloud region 16A with the system 100A acting as a micro cloud leader, while the vehicles 24A and 26A may not be members of the vehicular micro cloud.

As mentioned before, because vehicles are mobile in nature, it is not unusual for vehicles to enter or exit the vehicular micro cloud region 16A. Because the traditional onboarding procedure performed by the system 100A of the RSU 14A can be fairly lengthy, the system instead creates metadata when initially onboarding one of the vehicles seeking to join the vehicular micro cloud. As will be explained in more detail later, when a particular vehicle rejoins the vehicular micro cloud, the system 100A can determine if there is metadata associated with that vehicle and, if such a file exists, allow the vehicle to skip traditional onboarding procedures, allowing a more rapid formation and joining of the vehicular micro cloud by prior members.

Figure 1B:
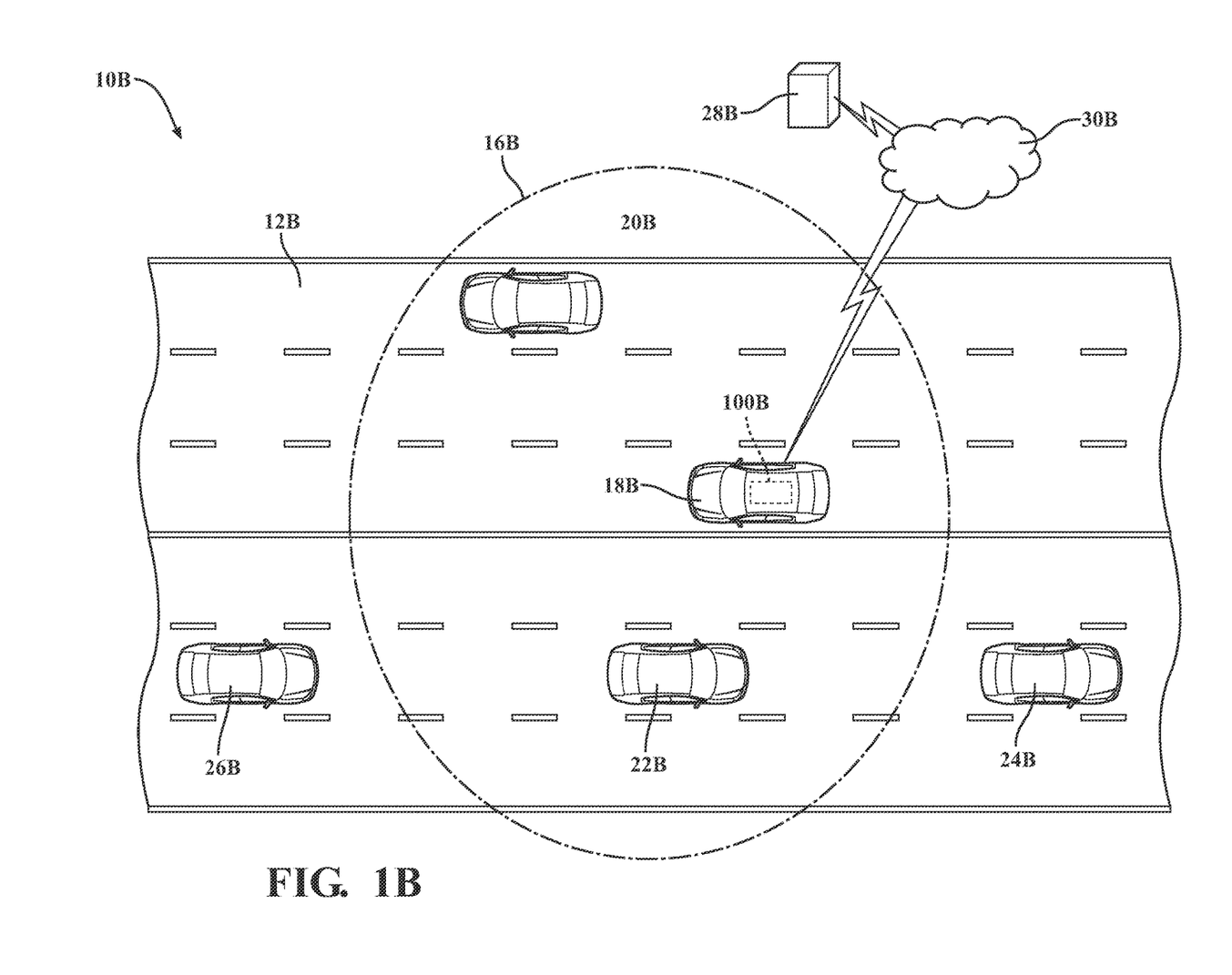
FIG. 1B illustrates one example of a mobile vehicular micro cloud, wherein a vehicle acts as a micro cloud leader for the mobile vehicular micro cloud.

As stated earlier, the vehicular micro cloud defined by the vehicular micro cloud region 16A and having the RSU 14A acting as micro cloud leader is a static vehicular micro cloud in that the vehicular micro cloud region 16A generally does not move. However, it should be understood that the systems and methods described in this description equally apply to mobile vehicular micro clouds. For example, FIG. 1B illustrates a scenario 10B involving mobile vehicular micro clouds. For the sake of simplicity, like reference numerals have been utilized to refer to like elements. As such, any prior description regarding these elements is equally applicable in this example.

Moreover, the scenario 10B illustrates an example wherein the system 100B is incorporated within the vehicle 18B. It should be understood that the incorporation of the system 100B within the vehicle 18B is merely an example and that the system can be incorporated in another, some, or any of the other vehicles 20B-26B in this example. Here, the vehicle 18B is shown to be traveling down one of the roads 12B, thus causing the vehicular micro cloud region 16B to move along with the movement of the vehicle 18B. In situations where the vehicular micro cloud region 16B is mobile, there may be situations where some vehicles are more likely to remain within the vehicular micro cloud region 16B for a prolonged period of time. In comparison, other vehicles may only remain within the vehicular micro cloud region 16B for a rather short period of time.

For example, vehicle 20B is traveling in the same direction and is adjacent to the vehicle 18B that incorporates the system 100B. Assuming that the speeds of the vehicles 18B and 20B are fairly similar and they continue to travel along the same trajectory, the vehicle 20B is likely to remain within the vehicular micro cloud region 16B for a prolonged period of time. Conversely, the vehicle 22B, which is shown to be traveling in a direction opposite of the vehicles 18B and 20B, is only likely to be within the vehicular micro cloud region 16B for a fairly short period of time.

Because traditional onboarding procedures performed by the micro cloud leader to allow members to join the vehicular micro cloud are fairly lengthy, the vehicle 22B may not be able to join the vehicular micro cloud or only join for a brief period of time before leaving the vehicular micro cloud region 16B. As mentioned before and as will be explained in more detail later, when a particular vehicle rejoins the vehicular micro cloud, the system 100B can determine if there is metadata associated with that vehicle and, if such metadata exists, allow the vehicle to skip traditional onboarding procedures, allowing a more rapid formation and joining of the vehicular micro cloud by prior members. This allows the vehicle 22B to contribute and/or utilize resources provided by the vehicular micro cloud for a greater period of time than would be allowed if utilizing a traditional onboarding methodology.

Figure 2:
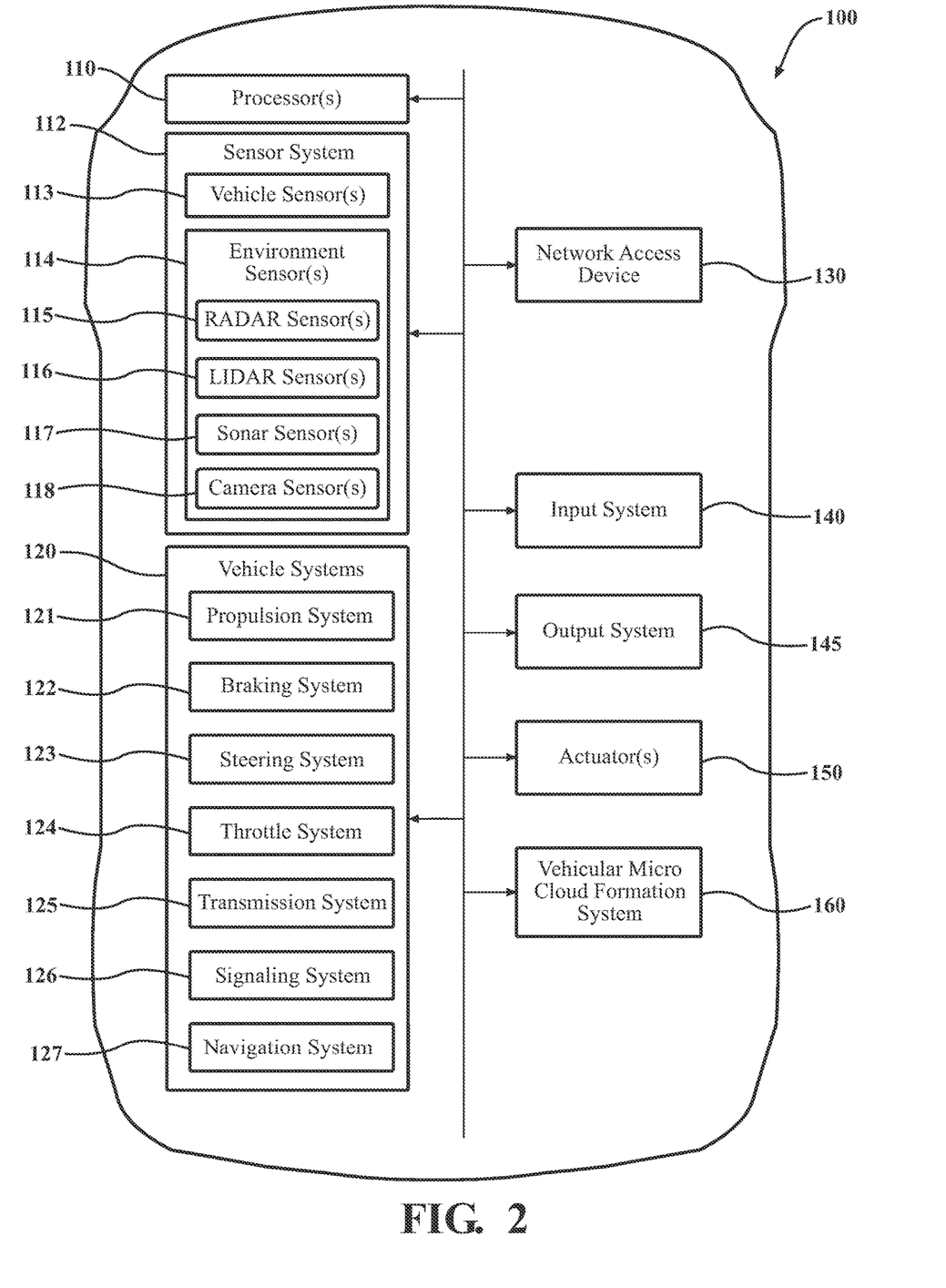
FIG. 2 illustrates a more detailed view of one example of the roadside unit and/or vehicle that acts as the micro cloud leader for the vehicular micro cloud.

Referring to FIG. 2, an example of a system 100 that allows for the fast formation of vehicular micro clouds is illustrated. The system 100 of FIG. 2 may be similar to the systems 100A and/or 100B shown and described in FIGS. 1A and 1B, respectively. As mentioned before, the system 100 may be incorporated within a vehicle, such as the vehicle 18B of FIG. 1B, or could be located within a fixed computational unit, such as the RSU 14A of FIG. 1A.

The system 100 also includes various elements. It will be understood that in various embodiments it may not be necessary for the system 100 to have all of the elements shown in FIG. 1. The system 100 can have any combination of the various elements shown in FIG. 2. Further, the system 100 can have additional elements to those shown in FIG. 2. In some arrangements, the system 100 may be implemented without one or more of the elements shown in FIG. 2. While the various elements are shown as being located within the system 100 in FIG. 1, it will be understood that one or more of these elements can be located external to the system 100. Further, the elements shown may be physically separated by large distances and provided as remote services (e.g., cloud-computing services).

For example, if the system 100 is incorporated within an RSU, such as the RSU 14A of FIG. 1A, the system 100 may not include vehicle sensor(s) 113, the vehicle systems 120, and other vehicle-related systems and subsystems. However, if the system 100 is incorporated within a vehicle, such as the vehicle 18B of FIG. 1B, the system 100 may include these elements as well as other related vehicle elements.

For the purposes of brevity, many of the elements of the system shown in FIG. 2 will be described later in this description. In either case, the system 100 includes a vehicular micro cloud formation system 160. The vehicular micro cloud formation system 160 may be responsible for the formation and management of a vehicular micro cloud, as well as the onboarding of various members of the vehicular micro cloud.

Figure 3:
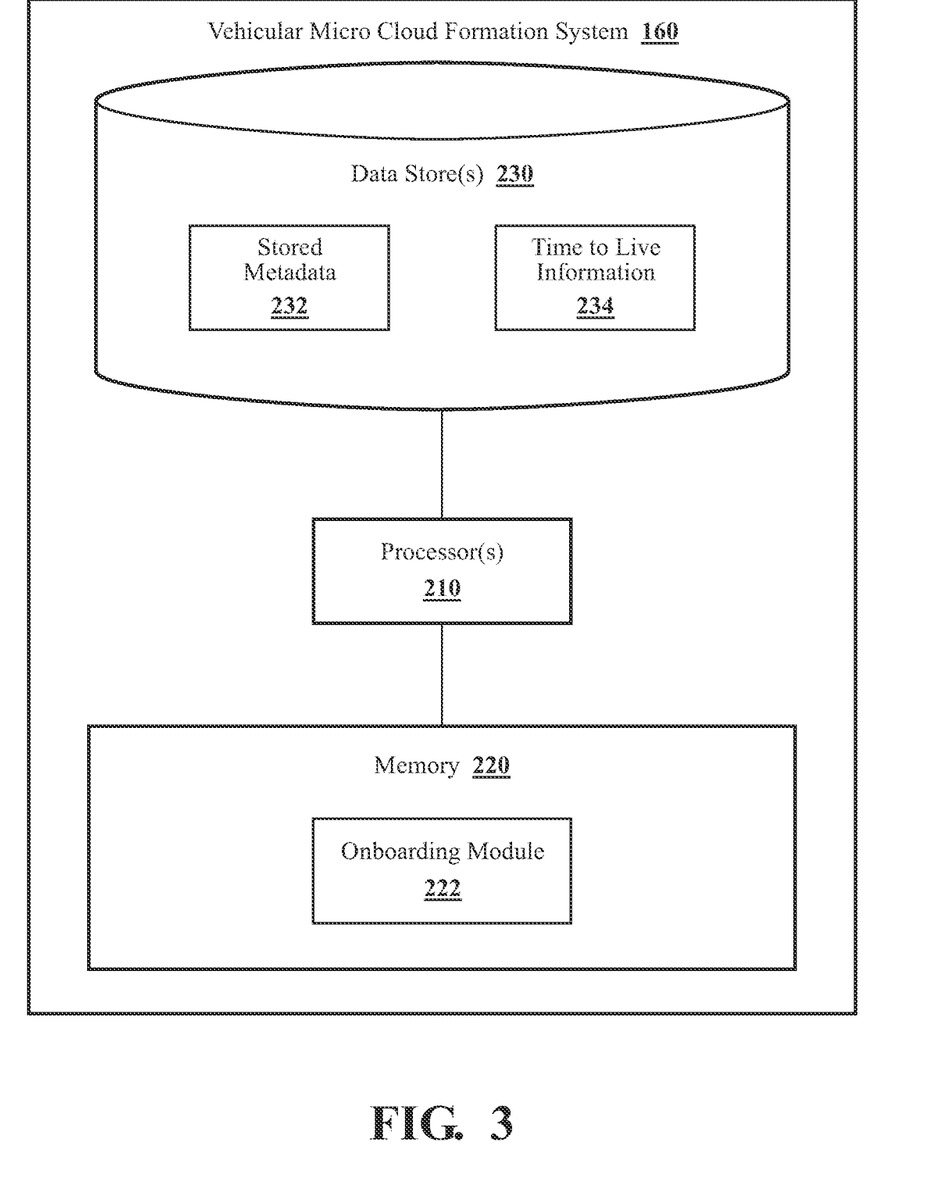
FIG. 3 illustrates a more detailed view of the vehicular micro cloud formation system that may be incorporated within the roadside unit and/or vehicle, allowing for fast vehicular micro cloud formation.

With reference to FIG. 3, one embodiment of the vehicular micro cloud formation system 160 is further illustrated. As shown, the vehicular micro cloud formation system 160 includes a processor(s) 210. Accordingly, the processor(s) 210 may be a part of the vehicular micro cloud formation system 160 or the vehicular micro cloud formation system 160 may access the processor(s) 210 through a data bus or another communication path. In some cases, the processor(s) 210 may be separate and apart from other processors, such as the processor(s) 110 of FIG. 2 or may be the same processor(s).

In one or more embodiments, the processor(s) 210 is an application-specific integrated circuit that is configured to implement functions associated with an onboarding module 222. In general, the processor(s) 210 is an electronic processor such as a microprocessor capable of performing various functions described herein.

In one embodiment, the vehicular micro cloud formation system 160 includes a memory 220 that stores the onboarding module 222. The memory 220 may be a random-access memory (RAM), read-only memory (ROM), a hard disk drive, a flash memory, or other suitable memory for storing the onboarding module 222. For example, the onboarding module 222 is computer-readable instructions that, when executed by the processor(s) 210, cause the processor(s) 210 to perform the various functions disclosed herein.

Furthermore, in one embodiment, the vehicular micro cloud formation system 160 includes a data store(s) 230. The data store(s) 230 is, in one embodiment, an electronic data structure such as a database that is stored in the memory 220 or another memory and that is configured with routines that can be executed by the processor(s) 210 for analyzing stored data, providing stored data, organizing stored data, and so on. Thus, in one embodiment, the data store(s) 230 stores data used by the onboarding module 222 in executing various functions. In one embodiment, the data store(s) 230 may include stored metadata 232, TTL information 234, and, for example, other information used by onboarding module 222.

The stored metadata may be a single file or collection of files that contain information collecting during the onboarding of a vehicle when the vehicle joins the vehicular micro cloud. The stored metadata 232 may include metadata that includes information used to identify the particular vehicle to confirm that the particular vehicle previously joined the vehicular micro cloud giving some sense of security and confirmation regarding the safety of allowing the vehicle to skip the traditional onboarding procedures when joining the vehicle or micro cloud.

In one example, the metadata contained within the stored metadata 232 may include information regarding visual cues of the vehicle seeking to join the vehicular micro cloud, time and date of creation information, creator or author of the metadata, location of the vehicle on a vehicular micro cloud where the metadata was initially created, standards and processes used to create the metadata, and a pseudo-ID of the vehicle. The visual cues can include the color, type, vehicle brand, license plate information, or other identifying information that can be visually perceived when observing the vehicle. The purpose of the stored metadata is to reidentify the vehicle for fast onboarding in vehicular micro clouds. The micro cloud leaders, such as the RSU 14A and/or the vehicle 18B, and/or other vehicles, can keep the stored metadata 232. Further, as will be explained later, the stored metadata 232 can be shared with other systems so that those other systems can also rapidly onboard the particular vehicle.

The stored metadata 232 can be dynamic and change according to different parameters. For example, since vehicles capable of connecting to the vehicular micro cloud may be connected to devices on other networks, such as cloud-based servers or edge servers, these vehicles may periodically share their information with other networks. The devices connected to these other networks may accumulate metadata and track the changes in metadata accordingly The TTL information 234 may be separated from the stored metadata 232 or may be incorporated within the stored metadata 232. The TTL information 234 can be a value for each vehicle with associated stored metadata. The values of the TTL information 234 can be utilized to determine if the stored metadata 232 associated with a particular vehicle has expired. If the stored metadata 232 associated with the particular vehicle has expired, the system 100 may perform a traditional onboarding procedure. Additional information regarding how the values regarding the TTL information 234 will be provided later in this disclosure.

Accordingly, the onboarding module 222 generally includes instructions that function to control the processor(s) 210 to perform the onboarding of a vehicle when the vehicle wishes to join a vehicular micro cloud. In particular, when a vehicle enters a vehicular micro cloud region, such as the vehicular micro cloud regions 16A and/or 16B, the vehicle may be subject to an onboarding procedure. In one example, the vehicle wishing to join a particular micro cloud provides an identifier to the system 100. This may be accomplished by a network access device 130 that forms part of the system 100 and is in communication with the processor(s) of the vehicular micro cloud formation system 160. The network access device 130 includes appropriate software and/or hardware to allow communication with vehicles wishing to join the vehicular micro cloud.

Upon receiving the identifier, the onboarding module 222 generally includes instructions that control the processor(s) 210 to determine if the vehicle identifier matches the information in the stored metadata 232. In one example, the identifier may be a pseudo-ID or fixed ID provided by the vehicle wishing to join the vehicular micro cloud. If the pseudo-ID or fixed ID matches an ID stored within the stored metadata 232, the onboarding module 222 may cause the processor(s) 210 to allow the vehicle to join the vehicular micro cloud without performing a standard onboarding procedure.

Of particular note, if the vehicle utilizes pseudo-IDs, the pseudo-ID used by that particular vehicle will change over time for privacy and/or vehicle network security reasons. When that occurs, the pseudo-ID provided may not match the pseudo-ID stored within the metadata 232. The system 100, as mentioned early, can also communicate with outside systems, such as the cloud-based servers 30A and 30B shown in FIGS. 1A and 1B via networks 28A and 28B, respectively. The cloud-based servers 30A and 30B may be able to receive information from the vehicles when they update their pseudo-IDs. This update to the pseudo-ID can then be provided to the system 100 to update the metadata 232 with the new pseudo-ID.

In other examples, the onboarding module 222 may cause the processor(s) 210 to consider additional information to identify the vehicle wishing to join the vehicular micro cloud. For example, the identifying information may include visual cues regarding the vehicle wishing to join the vehicular micro cloud, such as the color, type, vehicle brand, license plate information, and the like. The processor(s) 210 may be able to access the environment sensor(s) 114 of the system 100, best shown in FIG. 2, to visually confirm the identity of the vehicle wishing to join the vehicular micro cloud. The environment sensor(s) 114 can include any one of a number of different sensors, such as radar sensor(s) 115, LIDAR sensor(s) 116, sonar sensor(s) 117, and/or camera(s) 118.

Simultaneously or subsequently, the onboarding module 222 may cause the processor(s) 210 to determine if the TTL information 234 indicates the vehicle wishing to join the vehicular micro cloud should undergo a traditional onboarding process. Moreover, once the identity of the vehicle wishing to join the vehicular micro cloud has been confirmed, the TTL information 234 can be utilized to determine if the metadata 232 has essentially expired. The TTL information 234 can be a fixed value wherein all vehicles that have associated stored metadata 232 have a fixed value that, after expiration, requires that they re-undergo the traditional onboarding process.

However, in other instances, the TTL information 234 can vary based on the vehicle wishing to join the vehicular micro cloud and may be based on historical data collected regarding the vehicle wishing to join the vehicular micro cloud. For example, the onboarding module 222 may cause the processor(s) 210 to compare vehicles that have information stored within the metadata 232 to generate TTL values for each of the vehicles. Vehicles that are similar to each other may have similar TTL values, while vehicles that are different from each other may have different TTL values. Moreover, in one example, TTL values may be greater (i.e., longer duration before expiration) for vehicles that are routinely located near the system 100. These vehicles may routinely access the vehicular micro cloud generated by the system 100 and should be able to more rapidly join these vehicular micro clouds due to the frequency of their use of the vehicular micro cloud. If the vehicular micro cloud is a mobile vehicular micro cloud, similarities regarding the trajectories of the micro cloud leader and a particular vehicle may be compared to see how often the micro cloud leader and the particular vehicle are located near each other. The greater the similarity, the longer the TTL value will be. Conversely, if a vehicle rarely is located near a particular vehicular micro cloud, the TTL values may be shorter (i.e., shorter duration before expiration). The adjustment of the TTL values may be performed via a feedback loop.

Once the identity of the vehicle wishing to join the vehicular micro cloud is determined and/or the TTL value indicates that the metadata associated with the vehicle has not yet expired, the onboarding module 222 may cause the processor(s) 210 to allow the vehicle to join the vehicular micro cloud without performing a standard onboarding procedure. Conversely, if the identity of the vehicle and/or the TTL value indicates that the metadata has expired, the vehicle wishing to join the vehicular micro cloud may undergo a standard onboarding procedure.

If the vehicle wishing to join the vehicle or micro cloud does not have any associated metadata 232 or the TTL value indicates that the metadata has expired, the onboarding module 222 may cause the processor(s) 210 to perform a standard onboarding procedure. The standard onboarding procedure can vary but generally involves performing an initial security check, verifying the identity of the vehicle, and determining the resource availability of the vehicle.

The initial security check can determine if the vehicle wishing to join the vehicular micro cloud is a "ghost vehicle" or some other spoofing attempt. Moreover, ghost vehicles may be caused when malicious actors introduce a ghost vehicle through false messages that indicate the presence of a vehicle that is not actually there. If allowed access to the vehicular micro cloud, the ghost vehicle may be able to commandeer or negatively impact the functionality of the vehicular micro cloud, potentially raising safety and performance concerns. The onboarding module 222 may cause the processor(s) 210 to utilize the environment sensor(s) 114 to visually determine that an actual vehicle is present and not a ghost vehicle.

The verification of the identity of the vehicle can involve receiving an ID, such as a pseudo-ID, or other information to verify that the vehicle is indeed the claimed vehicle. Regarding resource availability, the onboarding module 222 may cause the processor(s) 210 to request and receive information from the vehicle wishing to join the vehicular micro cloud indicating their computational, communication, and/or storage resources. In addition, resource availability may also include receiving an indication regarding what computational, communication, and/or storage needs are requested by the vehicle wishing to join the vehicular micro cloud.

Once the initial security check, identity verification, and resource availability have been performed, the onboarding module 222 may cause the processor(s) 210 to allow the vehicle to join the vehicular micro cloud. In addition, because the vehicle has now completed the standard onboarding procedure, the onboarding module 222 may cause the processor(s) 210 to store some of the information performed during the standard onboarding procedure in the metadata 232. As explained previously, the metadata 232 can be utilized to allow the vehicle to rejoin the vehicular micro cloud more quickly, as the identity of the vehicle can be more rapidly determined.

Returning to the scenario 10A shown in FIG. 1A, the system 100A, which can be similar to the system 100 of FIG. 2, can include metadata regarding the vehicles 18A-26A. As such, if any of the vehicles 18A-26A seek to rejoin the vehicular micro cloud defined by the vehicular micro cloud region 16A, the vehicles 18A-26A can rapidly join the vehicular micro cloud so they can contribute and/or utilize resources provided by the members of the vehicular micro cloud. For example, vehicle 26A is shown to be located outside the vehicular micro cloud region 16A. If the system 100A includes metadata related to the vehicle 26A and the TTL information indicates that the metadata has not yet expired, the vehicle 26A, upon entering the vehicular micro cloud region 16A, can rapidly join the vehicular micro cloud. Conversely, if the system 100A does not include metadata related to the vehicle 26A or the TTL information indicates that the metadata has expired, the vehicle 26A would have to undergo a traditional and more time-consuming onboarding procedure.

Figure 4:
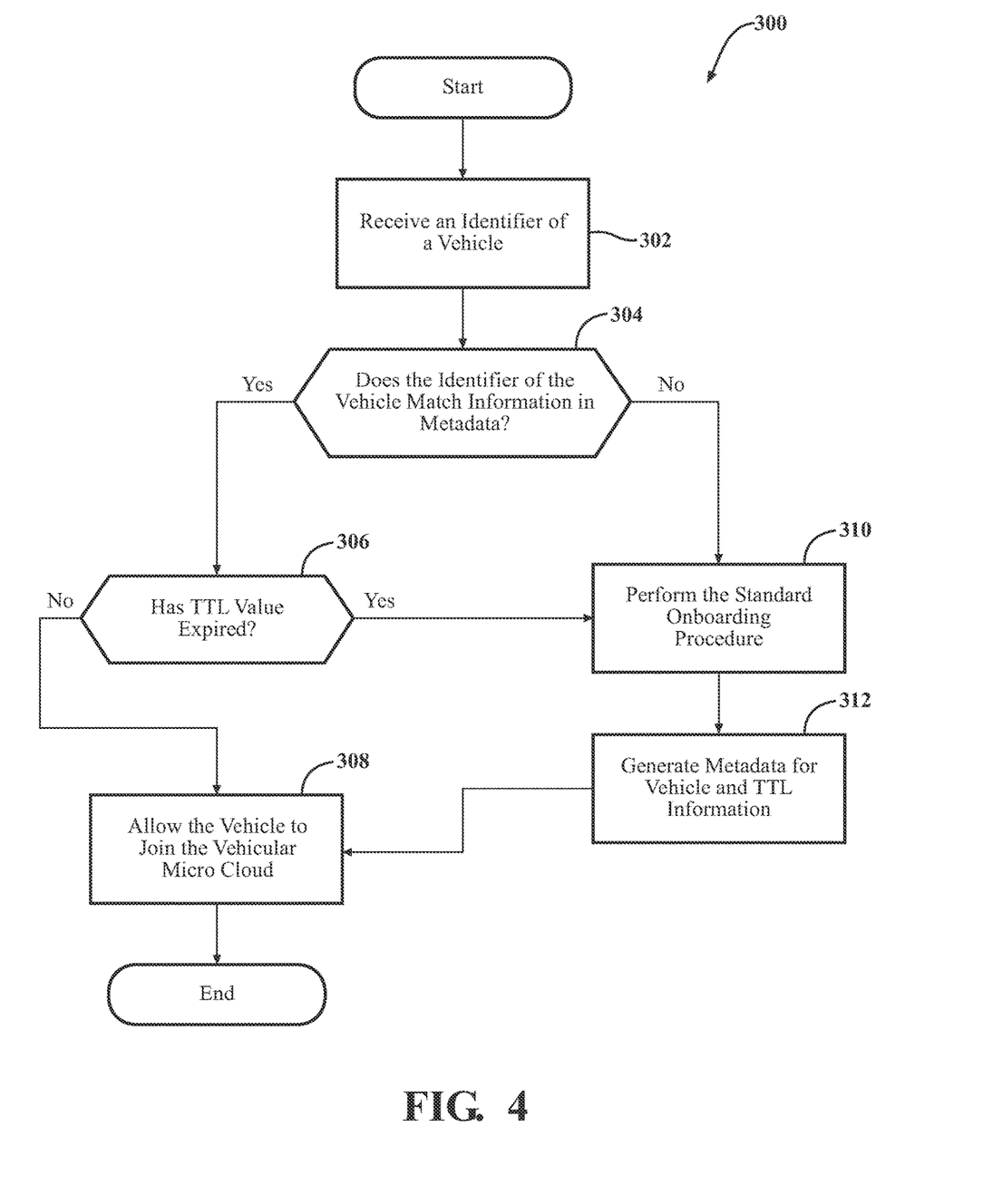
FIG. 4 illustrates a method for fast vehicular micro cloud formation.

Referring to FIG. 4, a method 300 for fast vehicular micro cloud formation is shown. The method 300 will be described from the viewpoint of the vehicular micro cloud formation system 160 of FIG. 3. However, it should be understood that this is just one example of implementing the method 300. While method 300 is discussed in combination with the vehicular micro cloud formation system 160, it should be appreciated that the method 300 is not limited to being implemented within the vehicular micro cloud formation system 160, but is instead one example of a system that may implement the method 300.

In step 302, the onboarding module 222 includes instructions that, when executed by the processor(s) 210, cause the processor(s) 210 to receive an identifier from a vehicle wishing to join a vehicular micro cloud. The identifier may be in the form of a pseudo-ID that can identify the vehicle. Additionally or alternatively, the identifier may also include other information, such as visual cues that can be confirmed by receiving information from the environment sensor(s) 114.

In step 304, the onboarding module 222 includes instructions that, when executed by the processor(s) 210, cause the processor(s) 210 to determine if the identifier matches information located in the stored metadata 232. For example, the stored metadata 232 can include information regarding the vehicle that can be identified as relating to the vehicle by cross-referencing the identifier with the stored information. The metadata, as explained previously, can include information regarding visual cues of the vehicle seeking to join the vehicular micro cloud, time and date of creation information, creator or author of the metadata, location of the vehicle on a vehicular micro cloud where the metadata was initially created, standards and processes used to create the metadata, and a pseudo-ID of the vehicle. The stored metadata 232 may include metadata that includes information used to identify the particular vehicle to confirm that the particular vehicle previously joined the vehicular micro cloud giving some sense of security and confirmation regarding the safety of allowing the vehicle to skip the traditional onboarding procedures when joining the vehicle or micro cloud.

If the identifier is determined to match the information in the stored metadata 232, the method proceeds to step 306, where a determination is made if it TTL value associated with that particular vehicle has expired. The TTL information 234 can be a value for each vehicle with associated stored metadata. The values of the TTL information 234 can be utilized to determine if the stored metadata 232 associated with a particular vehicle has expired. As explained previously, the TTL value can vary from vehicle to vehicle. For example, the onboarding module 222 may cause the processor(s) 210 to compare vehicles that have information stored within the metadata 232 to generate TTL values for each of the vehicles. Vehicles that are similar to each other may have similar TTL values, while vehicles that are different from each other may have different TTL values.

If the TTL value has not expired, the method proceeds to step 308, wherein the onboarding module 222 includes instructions that, when executed by the processor(s) 210, cause the processor(s) 210 to join the vehicular micro cloud while performing a traditional onboarding procedure. If the TTL value has expired, the method will proceed to step 310, which will be explained in the paragraph below.

Returning to step 304, if there is no match regarding the metadata, the method proceeds to step 310, where a standard onboarding procedure is executed. The standard onboarding procedure can vary but generally involves performing an initial security check, verifying the identity of the vehicle, and determining the resource availability of the vehicle. Typically, the standard onboarding procedure takes longer than performing the steps 306 and 308. As such, vehicles subject to waiting for step 310 to complete will be delayed in joining the vehicular micro cloud. As mentioned before, this delay can impact the performance of the vehicular micro cloud.

Once step 310 is completed, optional step 312 may be executed. Step 312 involves generating metadata and TTL information for the vehicle, which can be stored and the TTL information 234. The execution of step 312 allows the vehicle to potentially rejoin the vehicular micro cloud without performing the standard onboarding procedure detailed in step 310. By so doing, the vehicle can rejoin the vehicular micro cloud faster, providing benefits to both the vehicle and the vehicular micro cloud members thereof. After step 312 has been executed, the method 300 proceeds to step 308, when the vehicle is allowed to join the vehicular micro cloud.

The system 100 can include the sensor system 112. The sensor system 112 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 112 includes a plurality of sensors, the sensors can work independently from each other. Alternatively, two or more of the sensors can work in combination with each other. In such a case, the two or more sensors can form a sensor network. The sensor system 112 and/or the one or more sensors can be operatively connected to the processor(s) 110 and/or another element of the system 100 (including any of the elements shown in FIG. 2). The sensor system 112 can acquire data of at least a portion of the external environment of the system 100 (e.g., nearby vehicles).

The sensor system 112 can include any suitable type of sensor. Various examples of different types of sensors will be described herein. However, it will be understood that the embodiments are not limited to the particular sensors described. In the case that the system for fast vehicular micro cloud formation is incorporated within a vehicle, such as the vehicle 18B of FIG. 1B, the sensor system 112 can include one or more vehicle sensor(s) 113. The vehicle sensor(s) 113 can detect, determine, and/or sense information about the vehicle 18B. In one or more arrangements, the vehicle sensor(s) 113 can be configured to detect, and/or sense position and orientation changes of the vehicle 18B, such as, for example, based on inertial acceleration. In one or more arrangements, the vehicle sensor(s) 113 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 113 can be configured to detect, and/or sense one or more characteristics of the vehicle 18B. In one or more arrangements, the vehicle sensor(s) 113 can include a speedometer to determine a current speed of the vehicle 18B.

Alternatively, or in addition, the sensor system 112 can include one or more environment sensor(s) 114 configured to acquire, and/or sense environment data. "Environment data" includes data or information about the external environment in which the system for fast vehicular micro cloud formation is located. For example, the one or more environment sensor(s) 114 can be configured to detect, measure, quantify and/or sense other things in the external environment.

Various examples of sensors of the sensor system 112 will be described herein. The example sensors may be part of the one or more environment sensor(s) 114 and/or the one or more vehicle sensor(s) 113. However, it will be understood that the embodiments are not limited to the particular sensors described. As an example, in one or more arrangements, the sensor system 112 can include one or more radar sensor(s) 115, one or more LIDAR sensor(s) 116, one or more sonar sensor(s) 117, and/or one or more camera(s) 118. In one or more arrangements, the one or more camera(s) 118 can be high dynamic range (HDR) cameras or infrared (IR) cameras.

The systems 100A or 100B can include an input system 140. An "input system" includes any device, component, system, element or arrangement or groups thereof that enable information/data to be entered into a machine. The input system 140 can receive an input from an operator. The systems 100A or 100B can include an output system 145. An "output system" includes any device, component, arrangement, or group that enables information/data to be presented to an operator.

In the case that the system for fast vehicular micro cloud formation is incorporated within a vehicle, such as the vehicle 18B of FIG. 1B, the vehicle 18B can include one or more vehicle systems 120. Various examples of the one or more vehicle systems 120 are shown in FIG. 2. However, the vehicle 18B can include more, fewer, or different vehicle systems. It should be appreciated that although particular vehicle systems are separately defined, each or any of the systems or portions thereof may be otherwise combined or segregated via hardware and/or software within the vehicle 18B. The vehicle 18B can include a propulsion system 121, a braking system 122, a steering system 123, a throttle system 124, a transmission system 125, a signaling system 126, and/or a navigation system 127. Each of these systems can include one or more devices, components, and/or a combination, now known or later developed.

The system 100 can include one or more actuators 150. The actuators 150 can be any element or combination of elements operable to modify, adjust and/or alter one or more of the vehicle systems 120 or components thereof to be responsive to receiving signals or other inputs from the processor(s) 110. Any suitable actuator can be used. For instance, the one or more actuators 150 can include motors, pneumatic actuators, hydraulic pistons, relays, solenoids, and/or piezoelectric actuators, just to name a few possibilities.

The system 100 can include one or more modules, at least some of which are described herein. The modules can be implemented as computer-readable program code that, when executed by a processor(s) 110 and/or 210, implement one or more of the various processes described herein. One or more of the modules can be a component of the processor(s) 110 and/or 210, or one or more of the modules can be executed on and/or distributed among other processing systems to which the processor(s) 110 and/or 210 are operatively connected. The modules can include instructions (e.g., program logic) executable by one or more processor(s) 110.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for onboarding a vehicle to a vehicular micro cloud entering a vehicular micro cloud region, the vehicular micro cloud having a micro cloud leader, the method comprising steps of:
   receiving an identifier of the vehicle by the micro cloud leader, the micro cloud leader being another vehicle that is part of the vehicular micro cloud;
   in response to a determination by the micro cloud leader that the identifier of the vehicle matches information in metadata and a time to live has not expired, allowing, by the micro cloud leader, the vehicle to join the vehicular micro cloud without performing a standard onboarding procedure, the time to live having a duration based on a frequency in which the vehicle has previously accessed the vehicular micro cloud; and
   in response to a determination by the micro cloud leader that the identifier of the vehicle does not match information in the metadata, performing by the micro cloud leader the standard onboarding procedure for allowing the vehicle to join the vehicular micro cloud.

2. The method of claim 1, wherein the time to live is further based on a historical location of the vehicle with respect to a location of the vehicular micro cloud region.

3. The method of claim 2, wherein the historical location of the vehicle includes at least one of previous trajectories, parked locations, and time spent at particular locations.

4. The method of claim 1, wherein the standard onboarding procedure includes the steps of:
   performing an initial security check of the vehicle;
   verifying an identity of the vehicle;
   determining resource availability of the vehicle; and
   generating the metadata for the vehicle.

5. The method of claim 4, wherein the metadata further includes at least one of:
   time and date of creation of the metadata;
   location of the vehicle on the vehicular micro cloud;
   location of the vehicle when the metadata was created;
   standards and process used to create the metadata; and
   a pseudo-ID of the vehicle.

6. The method of claim 5, further comprising the step of updating the pseudo-ID of the vehicle with a new pseudo-ID of the vehicle.

7. The method of claim 1, further comprising the step of distributing the metadata to a different micro cloud leader, the different micro cloud leader being a second vehicle that is part of the vehicular micro cloud.

8. A system for onboarding a vehicle to a vehicular micro cloud entering a vehicular micro cloud region, the vehicular micro cloud having a micro cloud leader, the system comprising:
   a processor; and
   a memory in communication with the processor, the memory having instructions that; when executed by the processor, cause the processor to:
      receive an identifier of the vehicle by the micro cloud leader, the micro cloud leader being another vehicle that is part of the vehicular micro cloud,
      in response to a determination by the micro cloud leader that the identifier of the vehicle matches information in metadata and a time to live has not expired, allow, by the micro cloud leader, the vehicle to join the vehicular micro cloud without performing a standard onboarding procedure, the time to live having a duration based on a frequency in which the vehicle has previously accessed the vehicular micro cloud, and
      in response to a determination by the micro cloud leader that the identifier of the vehicle does not match information in the metadata, perform by the micro cloud leader the standard onboarding procedure for allowing the vehicle to join the vehicular micro cloud.

9. The system of claim 8, wherein the time to live is based further on a historical location of the vehicle with respect to a location of the vehicular micro cloud region.

10. The system of claim 9, wherein the historical location of the vehicle includes at least one of previous trajectories, parked locations, and time spent at particular locations.

11. The system of claim 8, wherein the standard onboarding procedure includes causing the processor to:
   perform an initial security check of the vehicle,
   verify an identity of the vehicle,
   determine resource availability of the vehicle, and
   generate the metadata for the vehicle.

12. The system of claim 11, wherein the metadata further includes at least one of:
   time and date of creation of the metadata;
   location of the vehicle on the vehicular micro cloud;
   location of the vehicle when the metadata was created;
   standards and process used to create the metadata; and
   a pseudo-ID of the vehicle.

13. The system of claim 12, wherein the memory further comprises instructions that, when executed by the processor, cause the processor to update the pseudo-ID of the vehicle with a new pseudo-ID of the vehicle utilizes the new pseudo-ID.

14. The system of claim 1, wherein the memory further comprises instructions that, when executed by the processor, cause the processor to distribute the metadata to a different micro cloud leader, the different micro cloud leader being a second vehicle that is part of the vehicular micro cloud.

15. A non-transitory computer readable medium including instructions that, when executed by a processor of a micro cloud leader, the micro cloud leader being another vehicle that is part of a vehicular micro cloud, cause the processor to:
- receive an identifier of a vehicle by the micro cloud leader;
- in response to a determination by the processor of the micro cloud leader that the identifier of the vehicle matches information in metadata and a time to live has not expired, allow, by the micro cloud leader, the vehicle to join the vehicular micro cloud without performing a standard onboarding procedure, the time to live having a duration based on a frequency in which the vehicle has previously accessed the vehicular micro cloud; and
- in response to a determination by the processor of the micro cloud leader that the identifier of the vehicle does not match information in the metadata, perform by the micro cloud leader the standard onboarding procedure for allowing the vehicle to join the vehicular micro cloud.

16. The non-transitory computer readable medium of claim 15, wherein the time to live is further based on a historical location of the vehicle with respect to a location of a vehicular micro cloud region.

\* \* \* \* \*